US010184277B2

(12) United States Patent
Irwin et al.

(10) Patent No.: US 10,184,277 B2
(45) Date of Patent: Jan. 22, 2019

(54) LOCK MECHANISM FOR SECURING A LOCKABLE VOLUME

(71) Applicant: United States Postal Service, Washington, DC (US)

(72) Inventors: Donald E. Irwin, Fredericksburg, VA (US); Nan K. McKenzie, Garrett Park, MD (US); William Albert Tartal, Baltimore, MD (US); Victoria K. Stephen, Burke, VA (US); Michael J. Amato, Reston, VA (US)

(73) Assignee: United States Postal Service, Washington, DC (US)

(*) Notice: Subject to any disclaimer, the term of this patent is extended or adjusted under 35 U.S.C. 154(b) by 0 days.

(21) Appl. No.: 15/920,337

(22) Filed: Mar. 13, 2018

(65) Prior Publication Data

US 2018/0202204 A1 Jul. 19, 2018

Related U.S. Application Data

(63) Continuation of application No. 14/095,794, filed on Dec. 3, 2013, now abandoned.

(60) Provisional application No. 61/733,657, filed on Dec. 5, 2012.

(51) Int. Cl.

| | |
|---|---|
| ***E05C 19/00*** | (2006.01) |
| ***E05B 17/00*** | (2006.01) |
| ***E05B 47/02*** | (2006.01) |
| ***E05B 63/12*** | (2006.01) |
| ***E05C 3/02*** | (2006.01) |

(Continued)

(52) U.S. Cl.

CPC .......... *E05C 19/00* (2013.01); *E05B 17/0025* (2013.01); *E05B 17/0029* (2013.01); *E05B 47/023* (2013.01); *E05B 63/12* (2013.01); *E05C 3/02* (2013.01); *E05B 65/025* (2013.01); *E05B 2015/0235* (2013.01); *Y10T 292/1021* (2015.04); *Y10T 292/1082* (2015.04); *Y10T 292/294* (2015.04)

(58) Field of Classification Search

CPC .................... Y10T 292/1021; Y10T 292/1082

USPC .................................................. 292/196, 197

See application file for complete search history.

(56) References Cited

U.S. PATENT DOCUMENTS

| | | | |
|---|---|---|---|
| 120,192 | A | 10/1871 | Greenough |
| 299,140 | A | 5/1884 | Hill |
| 532,067 | A | 1/1895 | Howe |

(Continued)

FOREIGN PATENT DOCUMENTS

| | | | |
|---|---|---|---|
| DE | 93 10 165 | U1 | 11/1994 |
| DE | 10 2009 0312001 | A1 | 12/2010 |
| DE | 10 2010 032995 | A1 | 2/2012 |

OTHER PUBLICATIONS

International Search Report dated Apr. 10, 2013 in International Application No. PCT/US12/68020.

*Primary Examiner* — Carlos Lugo

(74) *Attorney, Agent, or Firm* — Knobbe Martens Olson & Bear LLP

(57) ABSTRACT

A lock and method of locking a lockable volume is described. The lock may be located on a door of a lockable volume, such as a locker configured to hold an item. The lock may comprise a post and a cam, the cam having an opening corresponding to the size and shape of the post. The cam is rotatable about an axis, wherein the rotation of the cam about the axis releasably secures the post within the opening, thereby locking the door to which the post is attached.

10 Claims, 9 Drawing Sheets

(51) Int. Cl.

| | |
|---|---|
| *E05B 65/02* | (2006.01) |
| *E05B 15/02* | (2006.01) |

(56) References Cited

U.S. PATENT DOCUMENTS

| | | | | | |
|---|---|---|---|---|---|
| 621,318 | A | | 3/1899 | Brachhausen | |
| 790,842 | A | | 5/1905 | Janecek | |
| 837,811 | A | | 12/1906 | Ebbeson | |
| 961,780 | A | | 6/1910 | Lauzon | |
| 2,249,438 | A | | 7/1941 | Smith | |
| 2,325,225 | A | * | 7/1943 | Burke | E05B 47/0002 292/123 |
| 2,458,751 | A | | 1/1949 | Voight | |
| 2,548,681 | A | | 4/1951 | Oswald | |
| 2,592,073 | A | | 4/1952 | Emil | |
| 2,666,248 | A | | 1/1954 | Slaughter, Jr. | |
| 2,919,569 | A | | 1/1960 | Davis | |
| 3,039,837 | A | | 6/1962 | Poe | |
| 3,217,661 | A | | 11/1965 | Kemp | |
| 3,955,840 | A | * | 5/1976 | Rawls | E05B 47/0002 292/201 |
| 3,958,821 | A | | 5/1976 | Scalera | |
| 4,003,614 | A | | 1/1977 | Geer et al. | |
| 4,056,276 | A | * | 11/1977 | Jarvis | E05B 47/06 292/117 |
| 4,395,064 | A | * | 7/1983 | Bellot | E05B 81/20 292/201 |
| 4,674,781 | A | * | 6/1987 | Reece | E05B 81/25 292/201 |
| 4,691,949 | A | * | 9/1987 | Grantz | E05B 83/16 292/216 |
| 4,702,095 | A | | 10/1987 | Ben-Asher | |
| 4,783,103 | A | | 11/1988 | Schlegel | |
| 4,807,914 | A | | 2/1989 | Fleming et al. | |
| 4,913,475 | A | * | 4/1990 | Bushnell | E05B 47/026 292/144 |
| 5,042,855 | A | | 8/1991 | Bennett et al. | |
| 5,060,993 | A | | 10/1991 | Maier | |
| 5,120,096 | A | | 6/1992 | D'Silva | |
| 5,161,840 | A | | 11/1992 | Vaught | |
| 5,273,324 | A | * | 12/1993 | Kobayashi | E05B 81/20 292/201 |
| 5,288,037 | A | * | 2/1994 | Derrien | B64C 25/26 244/102 SL |
| 5,423,582 | A | * | 6/1995 | Kleefeldt | E05B 81/20 292/201 |
| 5,490,606 | A | | 2/1996 | Lombardo | |
| 6,032,500 | A | * | 3/2000 | Collard, Jr. | E05B 47/0002 292/144 |
| 6,050,116 | A | * | 4/2000 | Cole | E05B 15/0086 292/144 |
| 6,106,034 | A | | 8/2000 | Allen | |
| 6,116,663 | A | | 9/2000 | Robert | |
| 6,139,070 | A | | 10/2000 | Piltingsrud | |
| 6,149,213 | A | | 11/2000 | Sokurenko et al. | |
| 6,151,754 | A | | 11/2000 | Chen | |
| 6,152,499 | A | | 11/2000 | Robert | |
| 6,161,881 | A | | 12/2000 | Babka et al. | |
| 6,318,196 | B1 | * | 11/2001 | Chang | E05B 81/25 292/144 |
| 6,354,650 | B2 | | 3/2002 | Terhaar et al. | |
| 6,666,487 | B2 | * | 12/2003 | Oxley | E05B 81/22 292/144 |
| 6,746,073 | B2 | | 6/2004 | Heller et al. | |
| 6,845,909 | B2 | | 1/2005 | Bong et al. | |
| 7,165,427 | B1 | | 1/2007 | Lai | |
| 7,261,338 | B2 | * | 8/2007 | Spurr | E05B 81/20 292/201 |
| 7,726,707 | B2 | | 6/2010 | Simchayoff | |
| 7,922,223 | B2 | | 4/2011 | Lawrence | |
| 8,245,549 | B2 | * | 8/2012 | Zagoroff | E05B 83/12 292/144 |
| 8,491,021 | B2 | * | 7/2013 | Binder | E05B 17/0029 292/201 |
| 8,888,149 | B2 | * | 11/2014 | Lehr | E05B 17/10 292/201 |
| 9,212,505 | B2 | * | 12/2015 | Geng | E05B 47/0038 |
| 2004/0199284 | A1 | | 10/2004 | Hara | |
| 2005/0040932 | A1 | | 2/2005 | Cayne et al. | |
| 2005/0179349 | A1 | | 8/2005 | Booth et al. | |
| 2005/0212302 | A1 | * | 9/2005 | Fisher | E05B 81/14 292/216 |
| 2009/0284025 | A1 | * | 11/2009 | Salcombe | B64C 25/26 292/201 |
| 2014/0306467 | A1 | | 10/2014 | Wollacott et al. | |

* cited by examiner

LOCK MECHANISM FOR SECURING A LOCKABLE VOLUME

INCORPORATION BY REFERENCE TO ANY PRIORITY APPLICATION

Any and all applications for which a foreign or domestic priority claim is identified in the Application Data Sheet as filed with the present application are hereby incorporated by reference under 37 C.F.R. § 1.57. This application is a continuation of U.S. patent application Ser. No. 14/095,794, filed Dec. 3, 2013, which is related to U.S. Provisional Application 61/733,657, filed Dec. 5, 2012, the entire contents of which are incorporated herein by reference.

BACKGROUND

Field

This application relates to the field of locks. Specifically, it relates to locks on doors to control access therethrough, such as access to lockers which are configured to contain and enclose an item.

Description of the Related Technology

A lock is a mechanical or electronic fastening device that is used to secure an item. Locks are frequently used to secure an openable component such as, for example, a door or a gate. A lock used to secure a door or a gate frequently includes a feature configured to connect the door and/or gate with the door frame so as to prevent the door and/or gate from moving to an open position. This feature frequently includes a shaft that penetrates from the door into the doorjamb. In some embodiments, however, this component penetrates from the doorjamb into the door. While such locking mechanisms are adequate in numerous applications, they have several weaknesses, particularly in that the member that penetrates from the one portion of the door and/or doorjamb into the other portion of the door and/or doorjamb is easily accessible to a person trying to defeat the lock. Additionally, such a combination of a lock and a door and a doorjamb allows movement of the door relative to the doorjamb to the extent that the penetrating member does not precisely fit into the other off the door and/or the doorjamb. Both the accessibility of the penetrating member and the looseness of the fit between the penetrating member and the other of the door and/or doorjamb allows the lock to be more easily defeated and the door and/or gate to be opened. In light of these problems, new locks and locking mechanisms are required.

SUMMARY

Some embodiments described herein include a lock comprising a post, which comprises a shaft; a neck connected to the shaft, the neck having a first diameter; and a head, connected to the neck, the head having a second diameter, wherein the second diameter is larger than the first diameter; and a rolling cam having an opening formed in a first surface, wherein the first surface comprises an opening configured to receive the neck and the head of the post, and a securing portion configured to secure the neck and head of the post; wherein the rolling cam rotates about an axis of rotation to selectively secure the post.

In some embodiments, the first surface of the rolling cam is perpendicular to the axis of rotation.

In some embodiments, the first surface of the rolling cam is parallel to the axis of rotation.

In some embodiments, the post extends parallel to the axis of rotation of the rolling cam when the neck and head of the post are received in the opening of the rolling cam.

In some embodiments, the post extends perpendicular to the axis of rotation of the rolling cam when the neck and head of the post are received in the opening of the rolling cam.

In some embodiments, the opening of the rolling cam extends perpendicular to the axis of rotation of the rolling cam.

In some embodiments, the opening of the rolling cam extends parallel to the axis of rotation of the rolling cam.

In some embodiments, the opening of the rolling cam extends non-perpendicular to the axis of rotation of the rolling cam.

Some embodiments described herein include a locking system comprising a door comprising a post, the post comprising: a shaft; a neck connected to the shaft, the neck having a first diameter; and a head, connected to the neck, the head having a second diameter, wherein the second diameter is larger than the first diameter, and wherein the post extends from the door; and a lockable volume having a wall, the door being moveably attached to the lockable volume; a rolling cam attached to the wall of the lockable volume, the rolling cam having an opening formed in a first surface, wherein the first surface comprises an opening configured to receive the neck and the head of the post, and a securing portion configured to secure the neck and head of the post; and wherein the opening comprises a curved edge configured to contact the neck or the head of the post, and wherein the rolling cam rotates about an axis of rotation from an open to a closed position while the neck or head of the post is in contact with the curved edge, wherein the contact between the curved edge and the neck or head of the post causes the neck or head of the post to move into the securing portion; and wherein, when the rolling cam rotates into the closed position, the door is securely locked.

In some embodiments, the post further comprises a head located at the second end and a neck located between the head and the first end.

In some embodiments, the head comprises a first dimension and the neck comprises a second dimension.

In some embodiments, the first dimension is larger than the second dimension.

In some embodiments, the cam rotates about an axis of rotation.

In some embodiments, the axis of rotation is perpendicular to the first surface.

In some embodiments, the axis of rotation is non-perpendicular to the first surface.

In some embodiments, the post extends from the door parallel to the axis of rotation of the cam when the second end of the post is received in the opening of the cam.

In some embodiments, the post extends from the door perpendicular to the axis of rotation of the cam when the second end of the post are received in the opening of the cam.

In some embodiments, the opening of the cam extends perpendicular to the axis of rotation of the cam.

In some embodiments, the opening of the cam extends parallel to the axis of rotation of the cam.

In some embodiments, the opening of the cam extends non-perpendicular to the axis of rotation of the cam.

In some embodiments, the rolling cam is connected to an actuator, and the actuator is driven by a piston, and is configured to rotate the rolling cam from the open position to the closed position.

Some embodiments described herein include a method of securing a door with a lock, the method comprising moving a door, the door comprising a post, from a first position to a second position, wherein, in the second position, the post is received in an opening in a surface of a cam, disposed in a wall; and rotating the cam about an axis of rotation from a first position to a second position such that the opening in the surface of the cam secures the post and draws the door toward the wall, and prevents the door from being moved to the first position.

In some embodiments, the method further comprises rotating the cam about the axis of rotation from the second position to the first position, thereby aligning the opening with the post, allowing passage of the post out of the opening, such that the door can be moved to the first position.

In some embodiments, the method further comprises moving the door from the second position to the first position.

In some embodiments, the opening in the surface of the cam extends perpendicular to the axis of rotation.

In some embodiments, the opening in the surface of the cam extends parallel to the axis of rotation.

In some embodiments, the opening in the surface of the cam extends non-parallel to the axis of rotation.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Figure 1A:
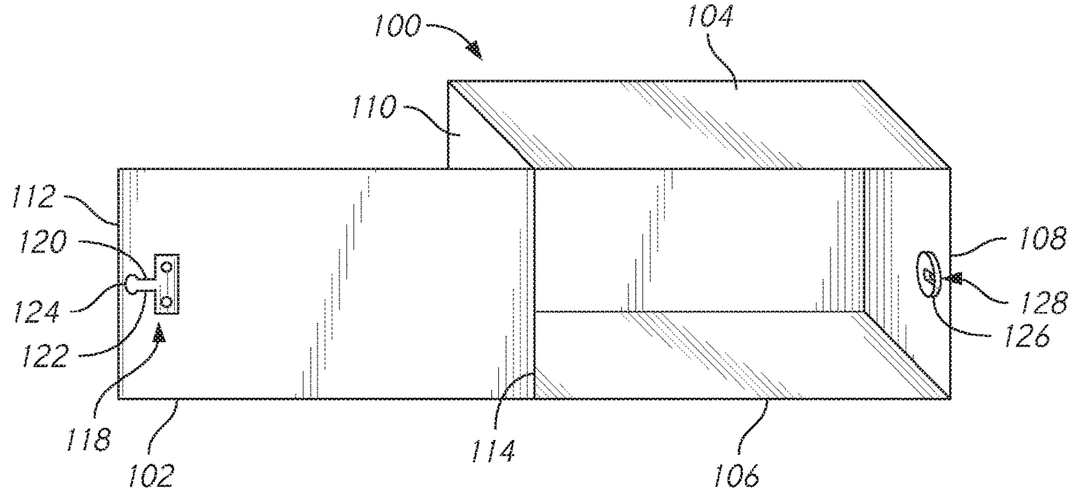
FIG. 1A depicts a perspective view of an embodiment of a lock on a securable volume.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein and as illustrated in the figures, can be arranged, substituted, combined and designed in a wide variety of configurations, all of which are explicitly contemplated and made part of this disclosure.

Some embodiments disclosed herein relate generally to a lock. The lock is configured to secure a lockable volume. In some embodiments, for example, the lock may comprise a post and a rolling cam. In some embodiments, a portion of or all of the post is engageable with the rolling cam. In some embodiments, for example, the rolling cam is moveable so as to secure the post and thereby secure the lockable volume.

Some embodiments disclosed herein relate to a lock system. The lock system may include a lockable volume, a door, a post, a rolling cam, an actuator, a mechanical chain, and a control unit. In some embodiments, for example, the rolling cam may be operated via the control unit. The control unit is configured to send a signal to the actuator of the lock upon request from a user or the system in which the lockable volume is contained. The actuator is moveable between at least a locked position and an unlocked position. In some embodiments, motion from the actuator may be transmitted to the rolling cam via the mechanical chain or to an electric motor directly connected to a shaft, which in turn, is connected to a rolling cam. Advantageously, the use of a lock system allows the automated securing of a wide variety of lockable volumes.

Lockable Enclosure

Figure 1B:
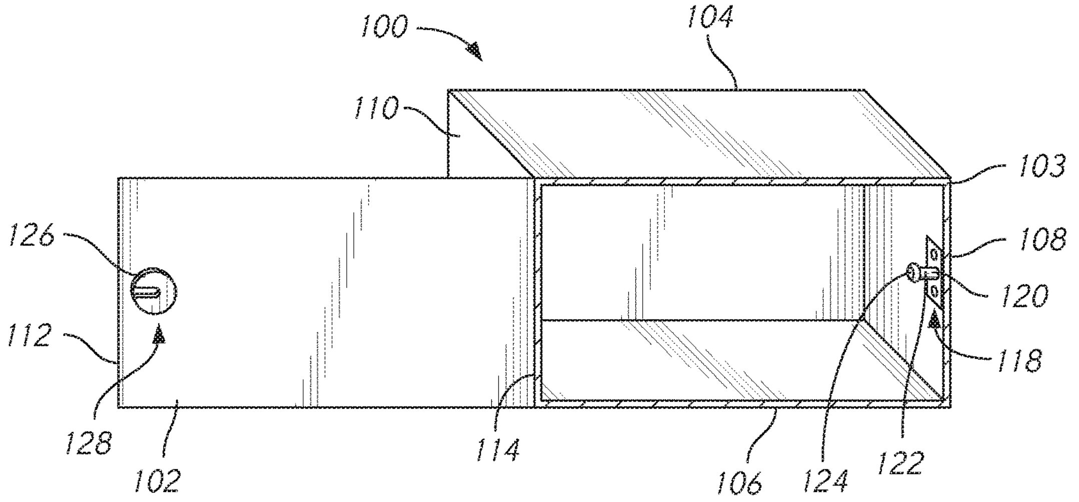
FIG. 1B depicts a perspective view of an embodiment of a lock on a securable volume.

FIGS. 1A and 1B depict one embodiment of a lockable volume 100. The lockable volume 100 may be configured to secure an internal volume, and to specifically secure an item in the internal volume of the lockable volume 100, for example, a parcel or a package. The lockable volume 100 may comprise a variety of shapes and sizes, and may be made from a variety of materials and/or components. In some embodiments, for example, the lockable volume 100 may be made of metal, wood, a synthetic material, a natural material, a composite, and/or any other desired material. In the embodiment depicted in FIGS. 1A and 1B, the lockable volume 100 may be made of sheet metal and may comprise a rectangular prism and/or a cube. The lockable volume may be configured for use in an electronic parcel locker system, such as that described in U.S. Provisional Application 61/567,048, the entire contents of which are incorporated herein by reference.

As also seen in FIGS. 1A and 1B, the lockable volume 100 comprises a door 102, a top 104, a bottom 106, a first side 108, a second side 110, and a back 111. While the lockable volume 100 comprises these above-listed features, the specific features that define the lockable volume 100 may vary based on the desired size and shape of the lockable volume 100.

As seen in FIGS. 1A and 1B, the door 102, the top 104, the bottom 106, the first side 108, the second side 110, and the back 111 are connected to each other to thereby form the lockable volume 100 and to define an internal volume of the lockable volume 100.

In some embodiments, and as seen in FIGS. 1A and 1B, the door 102 comprises a first end 112 and a second end 114. In some embodiments, the second end 114 is dynamically connected with another component of the lockable volume 100. Specifically, as seen in FIGS. 1A and 1B, the second end 114 is hingedly connected with the second side 110 of the lockable volume 100. Advantageously, this hinged connection between the second end 114 and the second side 110 of the lockable volume 100 allows the door 102 to be moved between a first, open position and a second, closed position. Lockable volume 100 further comprises a lip 103. In some embodiments, lip 103 runs around the interior perimeter of the opening bounded by the edges of the top 104, the bottom 105, the first side 108, and the second side 110. The door 102 impinges on lip 103 as the door moves into the second, closed position. The lip 103 thereby prevents movement of the door into the lockable volume 100. In some embodiments, for example, when the door 102 is positioned in its first, open position, the inner volume of the lockable volume 100 is accessible. In some embodiments, when the door 102 is positioned in its second, closed position, the interior volume of the lockable volume 100 is inaccessible. The door may be connected to a door actuator (not shown) which provides an opening force on the door, by using as a motorized hinge or other similar feature. The door actuator may receive open and close signals from the control unit in conjunction with the signals transmitted to the locking mechanism to ensure that the control unit does not attempt to open the door 102 while the lock is engaged.

In some embodiments, the door 102 may be slidably connected to the top 104 and the bottom 106 by a track or similar device. This allows for the door 102 to slide between an open position and a closed position within the plane comprising the opening of the lockable volume. Although this embodiment is not specifically depicted, a person of skill in the art would understand, using the present disclosure as a guide, how to provide a sliding door on a lockable volume described herein.

As seen in FIGS. 1A and 1B, the first end 112 of the door 102 comprises a feature to secure the door in the second, closed position. As depicted in FIG. 1A, this feature is a post 118, and as depicted in FIG. 1B, this feature is a rolling cam 126. Referring now to FIG. 1A, the post 118 is configured to selectively engage with other features of a lock to secure the door 102 in a second, closed position. The post 118 may comprise a variety of shapes and sizes, and may be made of a variety of materials. In some embodiments, for example, the size and shape and materials of the post may be designed to securely maintain the door 102 in a second, closed position. In some embodiments, such a design requires selecting a size, shape, and/or materials for the post 118 such that the post 118 can resist forces applied to the post when an attempt is made to forcibly open the door and thereby forcibly move the door 102 from the second, closed position to the first, open position.

FIG. 1A depicts one specific embodiment of the post 118. As seen in FIG. 1A, the post 118 comprises a shaft 120, a neck 122, and a head 124. In some embodiments, and as seen in FIG. 1A, the shaft 120 of the post 118 connects to the door 102 and to the neck 122. As further seen in FIG. 1A, the neck 122 can, in addition to connecting with the shaft 120 of the post 118, also connect to the head 124. The head 124 may comprise a variety of shapes and sizes and may be made from a variety of materials. Similarly, the neck 122 may comprise a variety of shapes and sizes and can be made from a variety of materials.

In some embodiments, and as seen in FIG. 1A, the post 118 is configured to engage with a rolling cam 126 when the door 102 is placed in the second closed position. In order to facilitate this, in some embodiments, for example, the rolling cam 126 is placed within the lockable volume 100 in a manner such that the post 118 engages with and/or interacts with the rolling cam 126 when the door 102 is in the second, closed position. As shown in FIG. 1A, the rolling cam 126 is located on the first side 108. The rolling cam 126 extends from the interior surface of the first side 108 such that it is positioned to receive the post 118 as the door 102 moves into the second, closed position. The extension of rolling cam 126 from the interior surface of the first side 108 allows for the post 118 to be positioned on the door 102 such that the protrusion of post 118 does not impinge on the edge of the first side 108, which would prevent complete closing of the door 102.

In some embodiments, for example, the neck 122 and the head 124 are sized and shaped to cooperatively engage with the rolling cam 126, in order to secure the post 118 and lock the door 102. In some embodiments, the cooperation of the head 124 and the neck 122 is facilitated by providing the neck 122 and the head 124 with differing dimensions. In some embodiments, the head 124 comprises a larger diameter than the neck 122. In some embodiments, for example, the head 124 may comprise the same dimensions as the neck 122. Specifically, for example, in some embodiments, the head 124 may comprise the same diameter as the neck 122.

As seen in FIG. 1A, the rolling cam 126 comprises an opening 128. The opening 128 is sized and shaped to receive the head 124. In some embodiments, the opening 128 is sized and shaped to receive the head 124 and the neck 122 of the post 118. As will be described in more detail later, in some embodiments, rolling cam 126 is configured to rotate along an axis of rotation. Thus, as after the opening 128 has received the neck 122 and the head 124 of the post 118, the rolling cam 126 may be rotated along the axis of rotation, which realigns the opening 128 relative to the post 118. As the door 102 closes, or moves in the close direction on its hinged connection, it impinges on a lip 103, which prevents further movement the door into the interior of lockable volume 100, and prevents further movement of the post 118 within the opening 128. With the door 102 in its second, closed position, and because of lip 103, the door 102 may only travel in the open direction, for example, away from the interior of lockable volume 100 on the hinged connection. As post 118 is inserted into opening 128, an outer surface of the cam extends above a portion of the head 124, so the head 124 is located between the outer surface and an inner surface of the rolling cam 126. Upon rotation of the rolling cam 126, the opening 128 is no longer positioned in a direction which will allow removal of the head 124 along the path of entry. Thus, the post 118 is held in position, preventing door opening. With the opening 128 realigned relative to the post 118, post 118, and therefore door 102, is not free to move in the open direction. Thus, the door 102 secured in the second, closed position. The rolling cam 126 comprises additional features, and these features will be discussed in further detail below.

As seen in FIG. 1B, the position of the post 118 and the rolling cam 126 may vary in different embodiments of the lockable volume 100. Specifically, in FIG. 1A, the post 118 is positioned on the first end 112 of the door 102, and the rolling cam 126 is positioned on the first side of the lockable volume 100. In the embodiment depicted in FIG. 1B, the post 118 is positioned on the first side 108 of the lockable volume 100 and the rolling cam 126 is positioned on the first end 112 of the door 102. A person of skill in the art will recognize that the rolling cam 126 and the post 118 may be provided in a variety of positions, so long as the rolling cam 126 is engageable with the post 118 to secure the door 102 in the second, closed position.

Figure 2A:
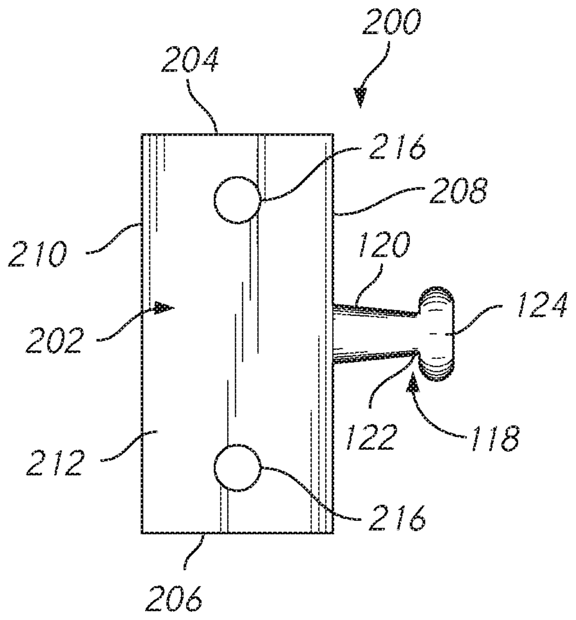
FIG. 2A depicts a front view of one embodiment of a post assembly having a side-extending post.
Figure 2B:
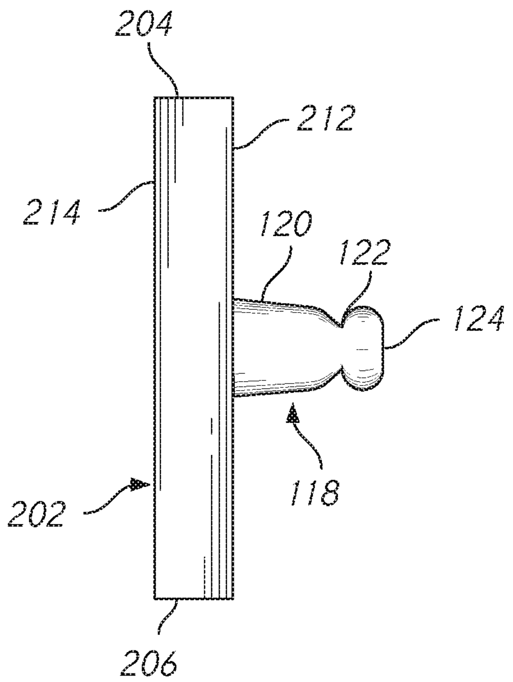
FIG. 2B depicts a side view of one embodiment of a post assembly having a post extending from the face of the post assembly.
Figure 2C:
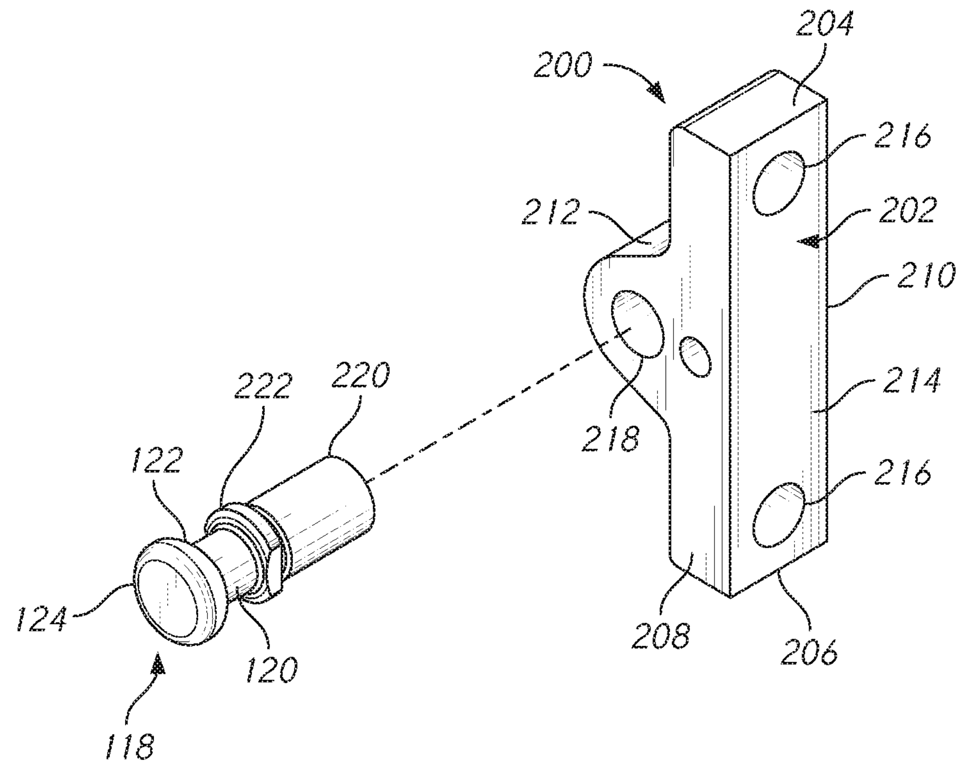
FIG. 2C depicts a perspective view of one embodiment of a post assembly having a separate post and base plate.

FIGS. 2A, 2B and 2C are views of embodiments of the post assembly 200. The post assembly 200 may be configured to allow attachment of the post 118 to the door 102 and/or to the other features of the lockable volume 100. The post assembly 200 comprises the post 118, the shaft 120, the neck 122, and the head 124. As shown in FIG. 2A, in one embodiment, the shaft 120 and the neck 122 are generally cylindrical, and comprise the same diameter and/or dimensions about its central axis, and the head 124 comprises an larger diameter and/or enlarged dimensions relative to the shaft 120 and the neck 122. The post assembly 200 further comprises a base plate 202, which may be configured to allow affixing of the post assembly 200 to the door 102 and/or one of the other components of the lockable volume 100. The base plate 202 may comprise a variety of shapes and sizes, and may be made from a variety of materials. In some embodiments, the base plate 202 and/or the post assembly 200 may comprise a metal, a natural material, a synthetic material, a composite, and/or any other desired material.

As shown in FIG. 2A, the base plate 202 comprises a top 204, a bottom 206, a first side 208, a second side 210, a face 212, and a back (not shown). In some embodiments, for example, the distance between the top 204 and the bottom 206 defines a height of the base plate 202. In some embodiments, the distance between the first side 208 and the second side 210 defines a width of the base plate 202. In some embodiments, the distance between the face 212 and the back defines a thickness of the base plate 202.

In some embodiments, for example, the base plate 202 comprises attachment features 216 configured to facilitate attachment of the base plate 202 to a portion of the lockable volume 100 such as, for example, the door 102 and/or the first side 108. The attachment features 216 may comprise a variety of features such as, for example, one or several through-holes, one or several latches, hooks, adhesives, and/or any other feature configured to affix the base plate 202 to a portion of the lockable volume 100. In some embodiments, and as depicted in FIG. 2A, the attachment features 216 may comprise through-holes which may be configured to allow affixing of the base plate 202 to a portion of the lockable volume 100 via, for example, a screw, a bolt, a nut, a rivet, and/or any other fastener.

The post 118 may extend from the base plate 202 in a variety of directions. In some embodiments, the direction of extension of the post 118 from the base plate 202 facilitates the locking of the lockable volume 100. The selection of the portion of the lockable volume 100 to which the post assembly 200 is attached will impact and determine the direction of extension of the post 118 from the base plate 202. As depicted in FIG. 2A, the post 118 extends from the first side 208 of the base plate 202. As seen in FIG. 2A, a first end of the shaft 120 connects to the base plate 202 and the second end of the shaft 120 connects to the neck 122. The neck 122, in addition to connecting with the shaft 120, also connects with the head 124 of the post 118. The neck 122 may be sized differently than the shaft 120 and the head 124. In some embodiments, the neck 122 has a narrower circumference than the shaft 120 or the head 124. In one embodiment, the neck 122 and the shaft 120 comprise the same element, extending from base plate 202 to head 124, having a uniform diameter or dimension along their length.

As shown in FIG. 2B, the post 118 may extend from the face 212 in a direction perpendicular to the face 212 of the base plate 202. As further seen in FIG. 2B, the first end of the shaft 120 connects to the face 212 of the base plate 202, and the second end of the shaft 120 connects to the neck 122. In addition to connecting with the shaft 120, the neck 122 additionally connects to the head 124. As seen in FIG. 2B, in some embodiments of the post 118 and/or of the post assembly 200, the shaft 120 and the head 124 have approximately equal dimensions and/or diameters, and the neck 122 comprises a reduced dimension and/or diameter relative to one or both of the shaft 120 and the head 124.

Although FIGS. 2A and 2B depict a specific placement of the post 118 relative to the base plate 202, a person of skill in the art will recognize the post 118 may be attached to any desired portion of the base plate 202. In some embodiments, and as depicted in FIGS. 2A and 2B, the post 118 is attached to an approximate center portion of one of the faces and/or sides of the base plate 202. In some embodiments, however, the post 118 can be connected to the base plate 202 at an off-center location.

FIG. 2C depicts another embodiment of the post assembly 200. Here, the post 118 and the base plate 202 comprise separate components. Such a design may advantageously facilitate manufacturing by allowing more precision machining and manufacturing of the post 118 and/or the base plate 202. The base plate 202 comprises a top 204, a bottom 206, a first side 208, a second side 210, a face 212, and a back 214. The base plate 202 further comprises attachment features 216.

In the specific embodiment of the post assembly 200 depicted in FIG. 2D, the base plate further comprises a post-receiving opening 218. The post-receiving opening 218 may comprise a variety of shapes and sizes. Specifically, the post-receiving opening 218 comprises a shape and a size corresponding to the shape and size of an insertion shaft 220.

In the embodiment depicted in FIG. 2C, the post-receiving opening 218 comprises a cylindrical bore into the base plate 202. The post-receiving opening is configured to receive a portion of the post 118 to thereby secure the post 118 to the base plate 202.

As also depicted in FIG. 2C, the post assembly 200 comprises the post 118. The post 118 comprises a shaft 120, a neck 122, and a head 124. As seen in FIG. 2C, the shaft 120 and the neck 122 have an approximately equal diameter and/or dimension, and the head 124 has an enlarged dimension and/or diameter relative to the shaft 120 and the neck 122. The insertion shaft may comprise a variety of shapes and sizes and may be made from a variety of materials. In the embodiment depicted in FIG. 2C, the insertion shaft comprises an elongate member. In some embodiments, the insertion shaft 220 comprises an elongate cylinder. In some embodiments, the insertion shaft may be sized and shaped to allow placement of the insertion shaft 220 in the post-receiving opening 218. In some embodiments, the insertion shaft 220 comprises features and/or characteristics configured to facilitate retention of the insertion shaft 220 and the post-receiving opening 218. In some embodiments, for example, these features may comprise one or several locking features, threads, latches, snaps, detents, and/or any other desired retention feature. In some embodiments, a dimension and/or diameter of the insertion shaft 220 may be sized relative a dimension and/or diameter of the post-receiving opening 218 to thereby create a friction fit and/or an interference fit between the insertion shaft 220 and the post-receiving opening 218. Thus, friction between the insertion shaft 220 and the post-receiving opening 218 securely retains the insertion shaft 220 within the post-receiving opening 218.

As seen in FIG. 2C, in some embodiments in which the post 118 comprises a separate component from the base plate 202, the post 118 comprises an insertion stop 222. In some embodiments, for example, the insertion stop 222 is configured to allow the desired placement of the insertion shaft 220 in the post-receiving opening 218. As specifically depicted in FIG. 2C, the insertion stop 222 comprises an enlarged diameter relative to the insertion shaft. When the insertion shaft 220 is inserted into the post-receiving opening 218, the insertion stop 222 engages with the first side 208 of the base plate 202 as the insertion shaft 220 penetrates the post-receiving opening 218 to a desired distance. The engagement between the first side 208 and the insertion stop 222 prevents the over-insertion of the post 118, and specifically the insertion shaft 220, into the post-receiving opening 218. This allows accurate and repeatable assembly of the post 118 to the base plate 202.

Figure 3A:
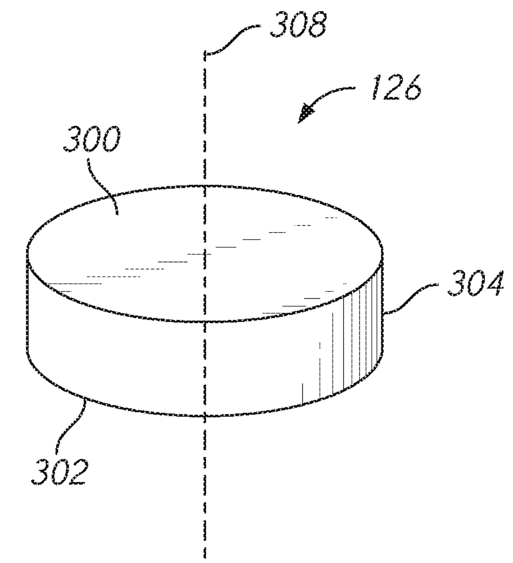
FIG. 3A depicts a perspective view of an embodiment of a rolling cam.
Figure 3B:
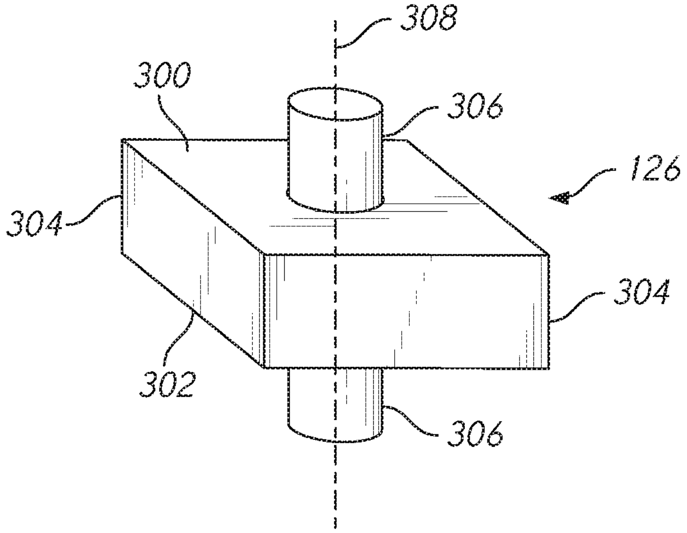
FIG. 3B depicts a perspective view of an embodiment of a rolling cam including a shaft.

As discussed above, some embodiments of the lockable volume 100 comprise a rolling cam 126. FIGS. 3A and 3B depict embodiments of the rolling cam 126. As seen in the embodiment of the rolling cam 126 depicted in FIG. 3A, the rolling cam 126 comprises a top 300, a bottom 302, and a side surface 304. In some embodiments, and as depicted in FIG. 3A, the rolling cam 126 further comprises an axis of rotation 308. In some embodiments the axis of rotation 308 extends through the center of the rolling cam 126 perpendicular to the top 300 and the bottom 302.

FIG. 3B depicts another embodiment of the rolling cam 126. As seen in FIG. 3B, the rolling cam 126 comprises a top 300, a bottom 302, a side surface 304, a shaft 306, and an axis of rotation 308. As seen in FIGS. 3A and 3B, the rolling cam 126 may comprise a variety of shapes. In some embodiments, the rolling cam 126 may comprise a circular shape. As shown in FIG. 3A, the side surface 304 comprises a bearing surface to allow the rolling cam 126 to rotate about the axis of rotation 308. In some embodiments, and as depicted in FIG. 3B, the rolling cam 126 comprises a bearing surface that may be located on, for example, the shaft 306. In such an embodiment in which the bearing surface is located on the shaft 306, the rolling cam 126 may comprise shapes that do not allow easy rolling of the rolling cam 126. Thus, in FIG. 3B, the rolling cam 126 comprises a rectangular prism and the shaft 306. The shaft 306 may be disposed within a bearing or housing which allows rotation of the shaft 306 along the axis of rotation 308, thereby causing the rectangular prism to rotate.

Figure 4A:
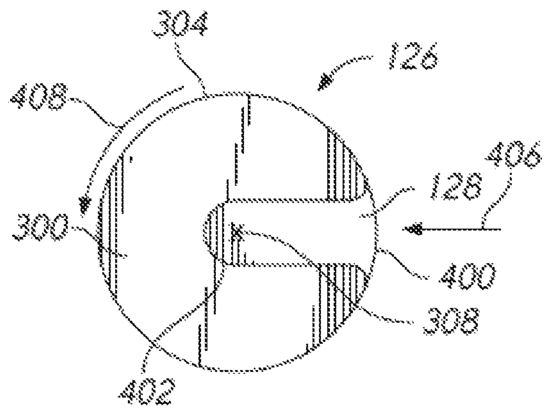
FIG. 4A depicts a top view of an embodiment of a rolling cam having an opening in the top of the rolling cam.
Figure 4B:
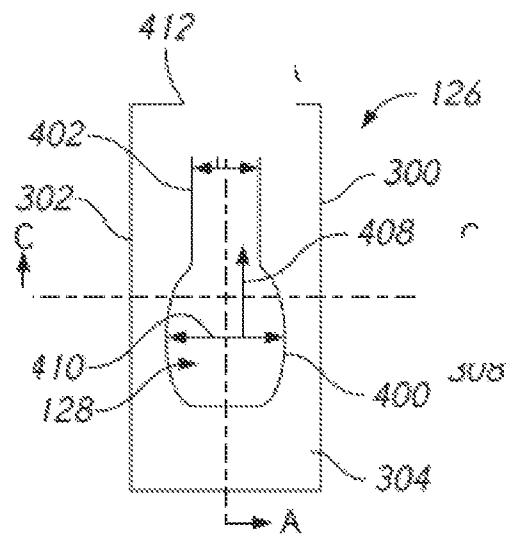
FIG. 4B depicts a side view of an embodiment of a rolling cam having an opening in the side surface of the rolling cam.
Figure 4C:
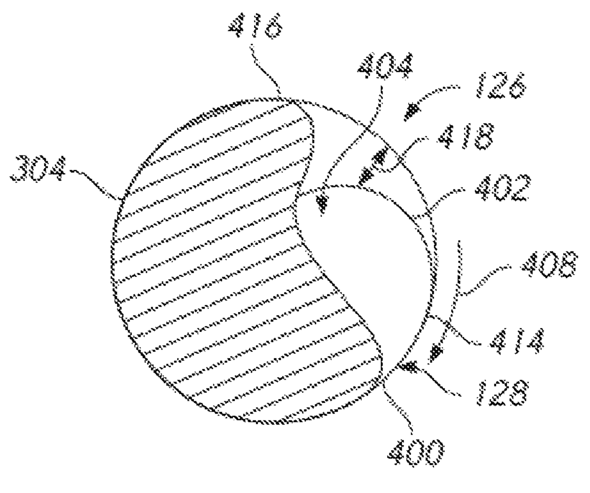
FIG. 4C is a sectional view of the embodiment of the rolling cam taken along line 4C-4C of FIG. 4B.

The rolling cam 126 is configured to lockably engage with portions of the post 118. FIGS. 4A-4C depict embodiments of features of the rolling cam 126 that may be configured to engage with the post 118. As seen in FIG. 4A, the rolling cam 126 comprises the top 300 and the side surface 304. As further seen in FIG. 4A, the rolling cam 126 comprises the opening 128. As discussed above, the opening 128 may be configured to receive all or portions of the shaft 118 to thereby secure the lockable volume 100. As specifically depicted in FIG. 4A, the opening 128 comprises a receiving portion 400 and a securing portion 402.

The receiving portion 400 may be configured to receive all or portions of the shaft 120 into the securing portion 402 of the rolling cam 126. In some embodiments, for example, the receiving portion may comprise features configured to facilitate receiving of the post 118. These features may include, for example, rounded edges, beveled edges, a taper, increased dimensions relative to the securing portion, and/or any other features configured to facilitate the receiving of the post 118.

The securing portion 402 comprises the portions of the rolling cam 126 configured to secure the post 118. The opening 128 comprises the securing portion 402 at one end, and the receiving portion 400 at the other end. The securing portion 402 is connected to the receiving portion 400 via the opening 128 of the rolling cam 126, and in one embodiment, is centrally located at the axis of rotation 308. In some embodiments, for example, the securing portion 402 may restrict the freedom of movement of the post 118 to a single direction. The freedom of movement of the post 118 is determined by the freedom of movement of the door 102, to which the post 118 is attached. In some embodiments, the door 102 is able to move in a closed direction toward the lockable volume 100 and in an open direction, away from the lockable volume. As described herein, the door 102 is dynamically connected to the lockable volume via a hinged connection or a slide connection. Also as described, the cooperation of the rolling cam 126 and the post 118 either locks the door 102 in the second, closed position, or allows the door 102 to move to a first, open position, according to the dynamic connection of the door 102. In some embodiments, this is accomplished by moving the rolling cam 126 around the axis of rotation 308 from a first position, in which the post 118 is able to move out of the securing portion 402, to a second position in which the post 118 is prevented from moving out of the securing portion 402. Specifically, upon moving the door 102 in the closed direction, the post 118 enters the securing portion 402 as it travels in a first direction 406. After the post 118 has been received in the securing portion 402 of the rolling cam 126, the rolling cam 126 may be rotated about the axis of rotation 308 in the direction of the first rotation 408 indicated in FIG. 4A. In some embodiments, for example, the first rotation 408 may comprise a rotation of, for example, 10°, 20°, 30°, 40°, 50°, 60°, 70°, 80°, 90°, 180°, 270°, 350°, and/or any other desired and/or intermediate rotation. In some embodiments, the first rotation 408 results in the opening 128 being aligned in a direction other than the initial direction, wherein the post 118 is prohibited from moving out of the securing portion 402 and the receiving portion 400 in a direction opposite to the first direction 406 indicated in FIG. 4A.

In some embodiments, the post 118 may be disposed within the opening 128, but is not fully in the securing portion 402. The opening 128 is sized and shaped such that, as the rolling cam 126 is rotated about axis of rotation 208, the edge of the opening 128 within rolling cam 126 impinges on the post 118, and pulls post 118 toward the securing portion 402. As the rotation of rolling cam 126 continues, post 118 arrives in the securing portion 402, and remains there while the door 102 is secured. This pulling force on the post 118 is translated to the door 102 to which the post 118 is attached, and the door 102 is pulled further in the close direction, so, preferably, the edge of door 102 contacts the edge of the doorjamb, or lip 103 prior to or as post 118 gets to the securing portion 402. This applies a tension force between the door and the lip 103 or the doorjamb, creating a positive and secure connection between the door 102 and the lip 103 or the doorjamb.

FIG. 4B depicts one embodiment of a rolling cam 126 in which the receiving portion 400 and the securing portion 402 are located in the side surface 304 of the rolling cam 126. As seen in FIG. 4B, the receiving portion 400 and the securing portion 402 of the rolling cam 126 extend partially around the side surface 304. In some embodiments, for example, the combination of the receiving portion 400 and the securing portion 402 may extend completely around the side surface 304 and/or extend partially around the side surface 304. In some embodiments, and as seen in FIG. 4B, the receiving portion 400 comprises a width 410. In some embodiments, for example, the width 410 corresponds to a dimension of the head 124 and/or neck 122 of the post. In some specific embodiments, for example, the width 410 may be larger than a dimension and/or diameter of the post 118, the neck 122, and/or the head 124 so as to allow portions of the post 118 such as, for example, the neck 122 and/or the head 124, to penetrate into and through the receiving portion 400.

In some embodiments, the rolling cam 126 comprises the securing portion 402. The securing portion may comprise a variety of shapes and sizes and dimensions. In some embodiments, the securing portion 402 may be connected to the receiving portion 400 such that a rotation of the rolling cam 126 in the direction indicated by arrow 408 move the post 118 from the receiving portion 400 into the security portion 402. As shown in FIG. 4B, the securing portion 402 comprises a width 412. Advantageously, in some embodiments, the width 412 is larger than a diameter and/or dimension of the neck 122 of the post 118 to thereby allow the post 118, and specifically the neck 122, to extend into the securing portion 402 and to thereby allow securing of the head 124 within the securing portion 402.

FIG. 4C is a sectional view of the embodiment of the rolling cam 126 shown in FIG. 4B, taken along the plane defined by line 4C-4C in FIG. 4B. FIG. 4C depicts one embodiment of the securing portion 402 of the rolling cam 126. As seen in FIG. 4C, the rolling cam 126 comprises an opening 128 and a side surface 304. The rolling cam 126 shown in FIG. 4C further comprises a receiving portion 400 and a securing portion 402. The receiving portion 400 and the securing portion 402 define, in part, the boundaries of a head cavity 404. The head cavity is configured to receive the head 124 and/or all or portions of the neck 122 of the post 118 when portions of the post 118 are received into the receiving portion 400 and/or the securing portion 402. The head cavity 404 may comprise a variety of shapes and sizes, and may be defined by a variety of portions of the rolling cam 126. In some embodiments, for example, the head cavity 404 is shaped and sized so as to allow the post 118 to be positioned in all positions of the receiving portion 400 and the securing portion 402 when the head 124 and/or all or portions of the neck 122 are received into the head cavity 404.

As seen in FIG. 4C, the securing portion 402 comprises a first end 414 and a second end 416. As seen in FIG. 4C, the first end 414 of the securing portion 402 is proximate to the receiving portion 400 of the rolling cam 126, and the second end 416 is relatively more distant from the receiving portion 400 than the first end 414 of the securing portion 402. As further seen in FIG. 4C, when a portion of the post 118 is received into the receiving portion 400 and the rolling cam 126 is rotated in the direction of the first rotation 408, as indicated in FIG. 4C, the head 124 of the post 118 first engages with portions of the securing portion 402 proximate to the first end 414, and as the rolling cam 126 rotates in the direction of the first rotation 408, the head 124 moves forward into the opening 128, engages with portions of the securing portion 402 relatively more proximate to the second end 416. As this happens, a force is applied to the post 118 which, in some embodiments, increases as the rolling cam rotates, thereby increasing a securing force on the post 118, and, thus, on the door 102.

As shown in FIG. 4C, the securing portion 402 defines a thickness 418. In some embodiments, the securing portion 402 comprises a single thickness at all points between the first end 414 and the second end 416. In some embodiments, and as seen in FIG. 4C, the securing portion 402 comprises a changing thickness at points between the first end 414 and the second end 416. As specifically seen in FIG. 4C, the thickness 418 of the securing portion 402 progressively increases when moving from the first end 414 to the second end 416. In some embodiments, on rotation of the rolling cam 126, the increasing thickness 418 of the securing portion 402 applies an increasing force to the head 124 of the post 118, which force is transferred to the door 102, securely retaining the door 102 in the second, closed position. In some embodiments, for example, this force created by the increasing thickness 418 of the securing portion 402 may be used to secure the door 102 or the lockable volume 100, to seal the door or the lockable volume, or to pre-tension the door 102 or the lockable volume 100. Advantageously, the use of such a securing portion 402 to secure the lockable volume can, in some embodiments in connection with a seal, prevent a substance, such as a fluid, a gas, or solid, from entering into or exiting out of the lockable volume 100. In some embodiments, such a seal between the door 102 and the other portions of the lockable volume 100 may be used to facilitate maintenance of the temperature within the lockable volume 100. Advantageously, such features may increase the security of the lockable volume 100, and may increase the types of uses of the lockable volume 100, such as, for example, storing a perishable item such as a medication, a food item, and/or any other item that needs to be contained within a specified climate, may increase the weather security of an item by, for example, preventing the penetration of the elements into the lockable volume 100, and may prevent break-ins by removing slack from the lockable volume 100, pre-tensioning portions of the lockable volume 100, and thereby increasing the difficulty with which the lockable volume 100 may be accessed.

Figure 5A:
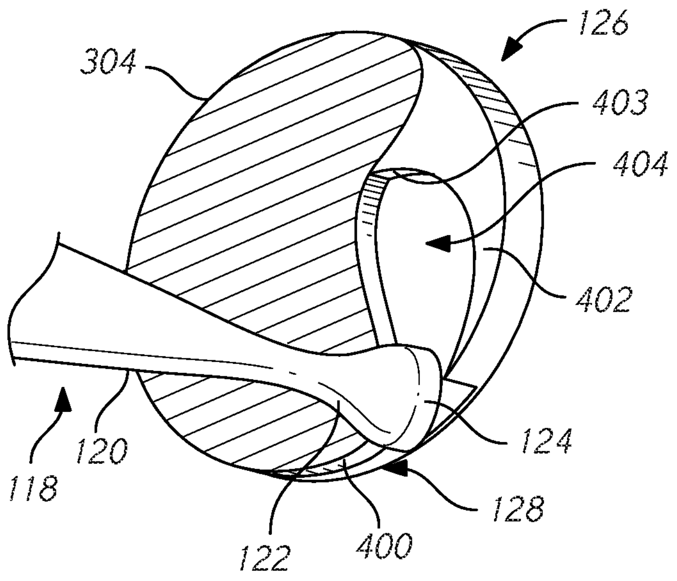
FIG. 5A is a perspective view of a post engaged with a cam in a first position.
Figure 5B:
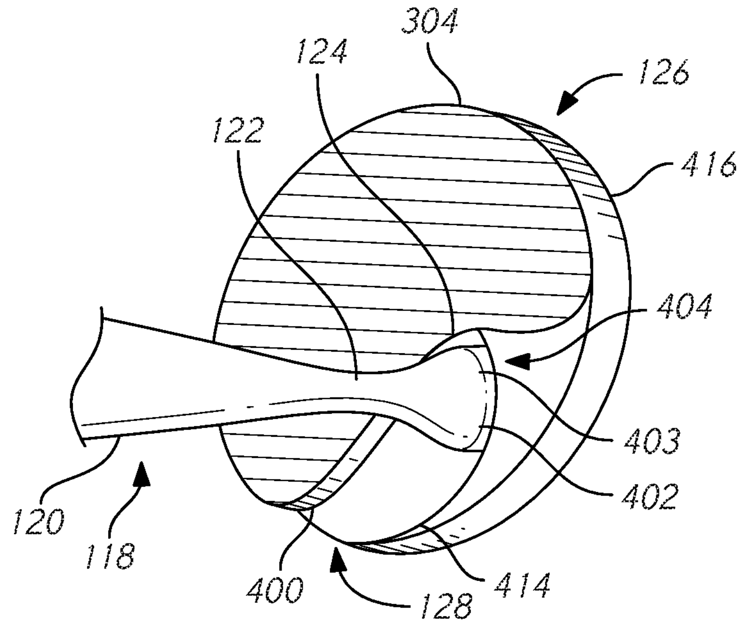
FIG. 5B is a perspective view of a post engaged with a cam in a second position.

FIG. 5A depicts a perspective view of the post 118 engaged in one embodiment of a rolling cam 126. Referring to FIG. 5A, the rolling cam 126 is in a first, unlocked position. In the first, unlocked position, the head 124 of post 118 is disposed within the receiving portion 400 of opening 128. In the first, unlocked position, the head 124 of post 118 is free to move out of the receiving portion 400 of opening 128, as the door 102 is opened. As rolling cam 126 is rotated into the second, closed position, the cam surface 403 impinges on the neck 122 or head 124 of post 118. As the thickness of the securing portion 402 changes as described above, the cam surface 403 forces the post 118 further into the opening 128, until the post 118 is secured within the securing portion 402 of the opening 128, as shown in FIG. 5B. FIG. 5B depicts the rolling cam 126 in a second, locked position. As described, in the locked position, the post 118 is securely retained within the securing portion 402 of the opening 128. In the second, locked position, the post 118 is unable to move out of the opening 128, thus, the door to which post 118 is attached remains securely locked.

Figure 6A:
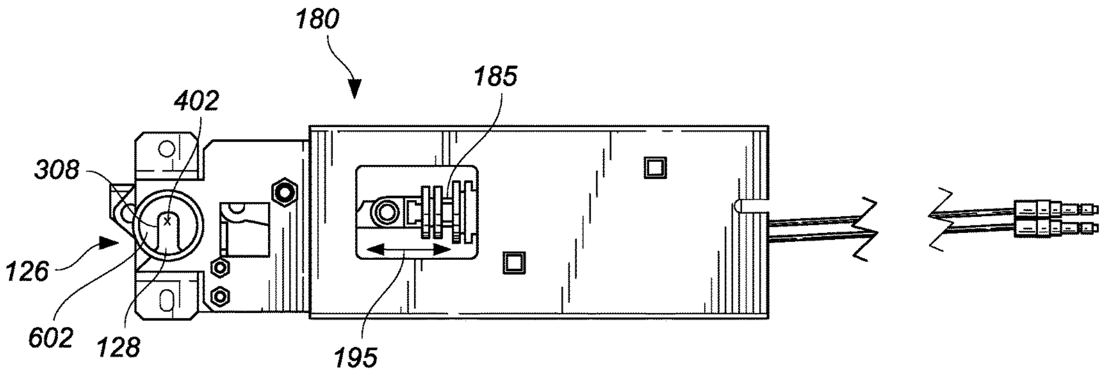
FIG. 6A is a side view of an embodiment of a lock mechanism with the cam in the locked position.

FIG. 6A depicts a side view of an embodiment of a lock mechanism with the cam in the locked position. The lock mechanism comprises actuator 180. The actuator comprises linkages (described hereinafter with reference to FIGS. 7A-7C) and a piston 185. The piston is connected to the linkages, and the linkages are connected to the rotating cam 126. As the piston 185 moves along the long axis of the actuator 180, as indicated by arrow 195, the connected linkages also move. The linkages are configured to impart a rotational motion to rolling cam 126 in responses to a linear movement of the piston 185. The piston is configured to be operated remotely by a remote signal, such as an electric or hydraulic signal. The remote signal may be supplied by a control unit as described elsewhere herein.

Figure 6B:
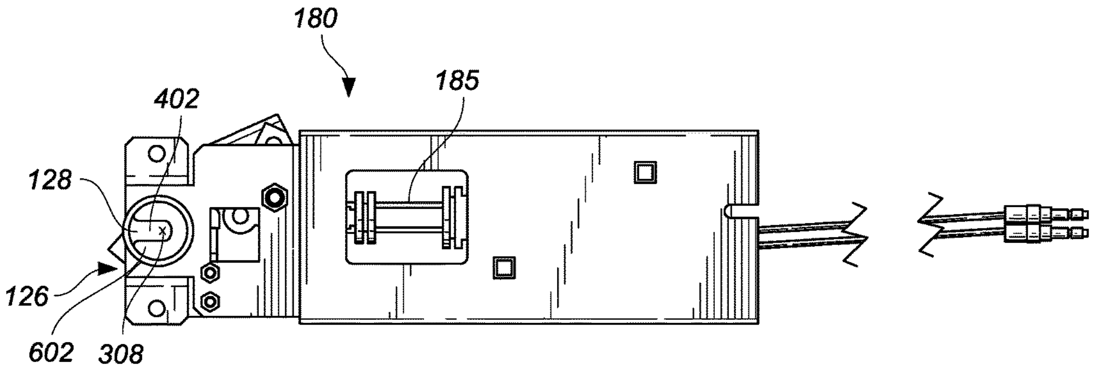
FIG. 6B is a side view of an embodiment of a lock mechanism with the cam in the unlocked position.

As shown in FIG. 6B, as the piston 185 moves linearly, the rolling cam 126 is operated such that it rotates around the axis of rotation 308, and, when used in conjunction with the post 118 as described herein, is effective to securely lock a door of a lockable volume 100.

Figure 7A:
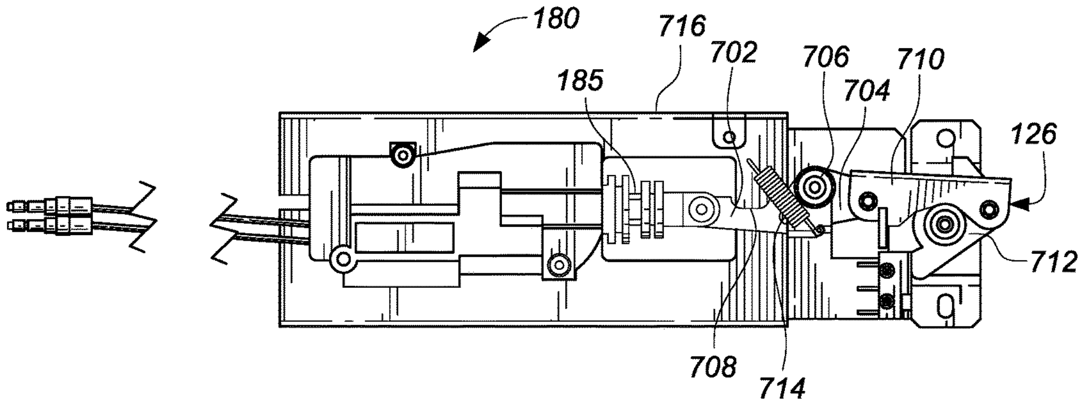
FIG. 7A is a side view of the reverse side of the lock mechanism of FIG. 6A with the cam in the locked position.
Figure 7B:
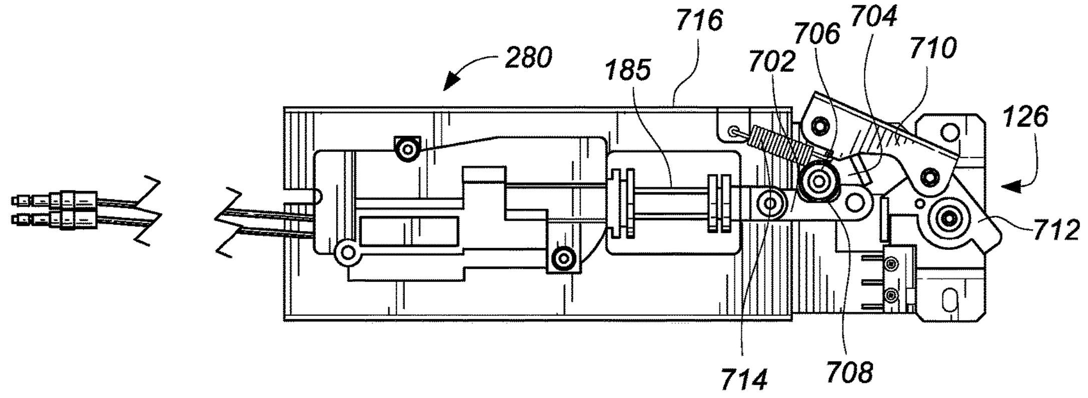
FIG. 7B is a side view of the reverse side of the lock mechanism of FIG. 6B with the cam in the locked position.
Figure 7C:
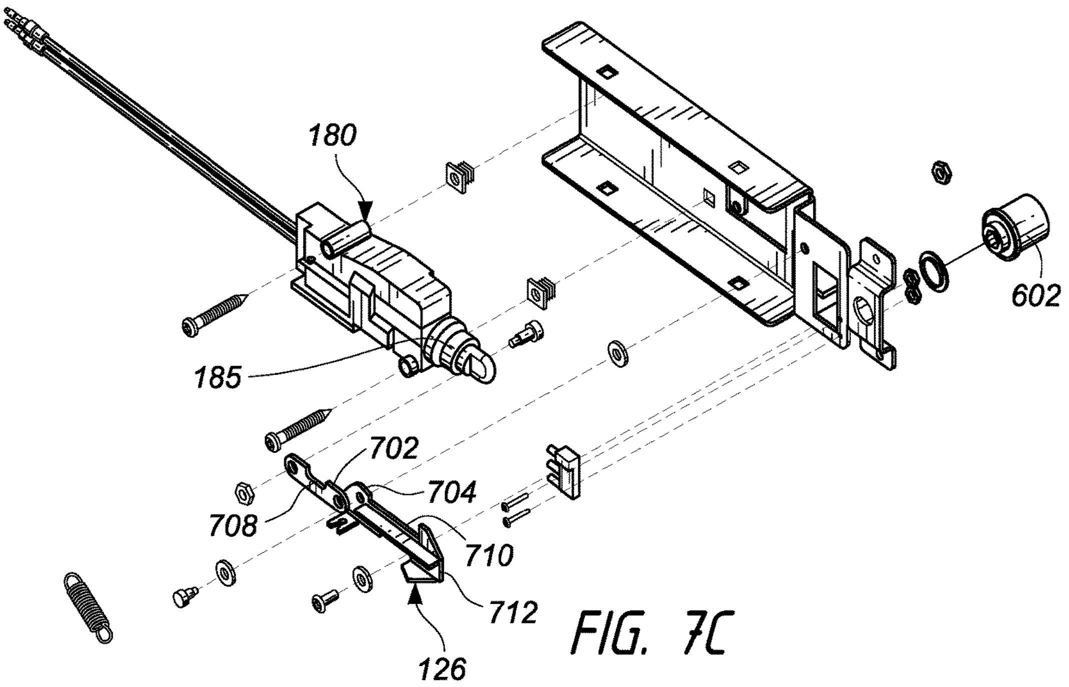
FIG. 7C is an exploded view of an embodiment of the lock mechanism of FIGS. 6A-6B.

FIG. 7A is a side view of the reverse of the lock mechanism with the cam in the locked position, as depicted in FIG. 6A. FIG. 7B is a side view of the reverse of the lock mechanism with the cam in the locked position, as depicted in FIG. 6B. FIGS. 7A-7B illustrate detail regarding the linkages for operating the rolling cam 126. In particular, FIGS. 7A-7B illustrate a first linkage member 702 which is rotatably connected at a first end portion to the forward portion of the piston 185. A second linkage member 704 is rotatably connected about a guide member 706 to an inner side of the frame. This second linkage member 704 is also rotatably connected at a first end portion to a second end portion of the first linkage member 702. In the configuration illustrated in FIG. 7B, with the piston 185 in the extended position, the guide member 706 rests on a section of the first linkage member 702 such as a depression 708. When the piston moves to the retracted position, as illustrated in FIG. 7A, the linkage member 702 is drawn in the travel direction of the piston 185. Accordingly, the guide member 706 is moved out of the depression 708 of the first linkage member, to the position illustrated in FIG. 7A. Further, a first end portion of the second linkage member 704 is rotatably connected to a first end portion of a third linkage member 710. A second end portion of the third linkage member 710 is rotatably connected to a mid-outer portion of a rotating plate 712 which comprises a portion of the rotating cam 126. FIG. 7C is an exploded view of an embodiment of the lock mechanism depicted in FIGS. 6A-7B. Also, FIG. 7A illustrates a bias member 714, such as a spring, which is mechanically connected at a first end to the frame 716, and at a second end to the first end portion of the second linkage member 704. Bias member 714 is configured to apply a first bias force to the second linkage member 704 when the rotatable cam 126 is in a first lock position, and to apply a second bias force to the second linkage member 704 when the rotatable cam 126 is in a second lock position. From FIG. 7C, it is seen that the rotating plate 712 is connected via an aperture in the frame 716 to a receiving portion 602 which substantially corresponds to the rolling cam illustrated in FIG. 4. As illustrated in FIG. 7C, rotating plate 712 and the receiving portion 602 lie on opposite sides of the frame 716, and are mechanically connected as shown to define the rolling cam 126. Accordingly, as the piston moves between the retracted position of FIG. 7A and the extended position of FIG. 7B, force is communicated from the piston 185 via the linking members 702, 704 and 710 to the plate 712, causing rotation thereof between the indicated positions. Likewise, rotation of the plate 712 causes transfer of force through the mechanical connection to the receiving portion 602, causing rotation of the receiving portion 602 between the positions illustrated in FIGS. 6A and 6B.

Figure 8:
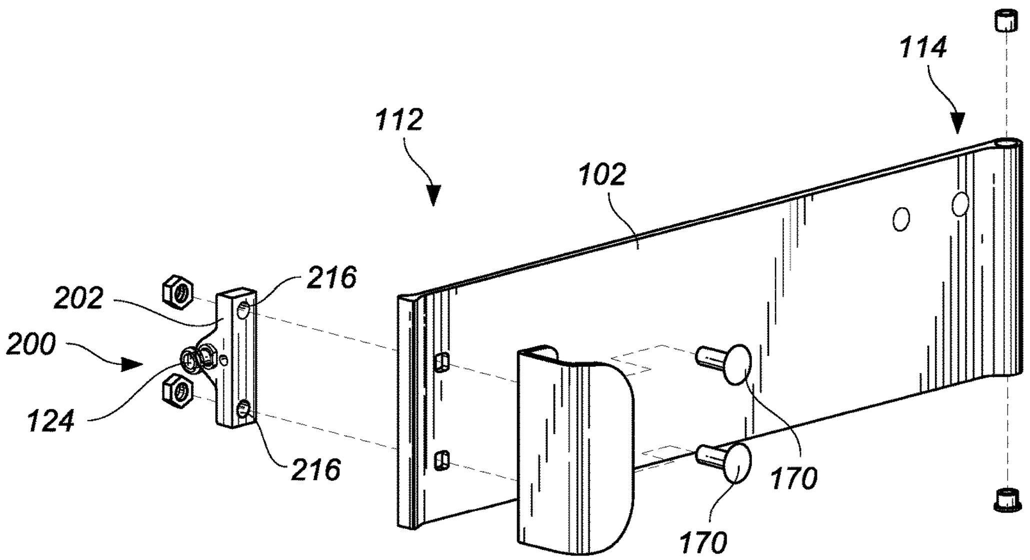
FIG. 8 is an exploded view of an embodiment of a door with a post assembly attached.

FIG. 8 is an exploded view of an embodiment of a door with the post assembly of FIG. 2C attached. The post assembly 200 is attached to the first end 112 of the door 102. The post assembly 200 is attached using two fasteners 170, which extend through the door 102 and into attachment features 216, thereby securely attaching the post assembly 200 to the door 102. As described above, the attachment features 216 may comprise a variety of features such as, for example, one or several through-holes, one or several latches, hooks, adhesives, and/or any other feature configured to affix the base plate 202 to a portion of the lockable volume 100. Post assembly 200 is positioned on the first end 112 of the door 102 in order to correspond to a rolling cam 126 which is attached to an internal surface of the lockable volume 100, on which the door 102 is attached. Further embodiments of a locking mechanism with door attachments are provided in Appendix A, attached hereto.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems can be inter-connected and controllably connected using a variety of techniques and hardware and that the present disclosure is not limited to any specific method of connection or connection hardware.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A lock mechanism comprising:

a frame defining an outer and an inner side and configured to support components of the lock mechanism;

an actuator mounted on the inner side of the frame, comprising a housing and a piston which is extendable from the housing such that a forward portion of the piston travels along a longitudinal axis of the piston outward from a retracted position near the housing to an extended position;

a first linkage member rotatably connected at a first end portion to the forward portion of the piston;

a second linkage member rotatably connected to the inner side of the frame at a fixed position, the second linkage member rotatably connected at a first end portion to a second end portion of the first linkage member, the second linkage member comprising a portion that rests on a section of the first linkage member when the piston is in the extended position and will move out of the section along a surface of the first linkage member when the piston is in the retracted position;

a third linkage member rotatably connected at a first end portion to a second end portion of the second linkage member;

a rotatable cam connected at its axis of rotation to the frame, the rotatable cam having a receiving portion that is exposed to the outer side of the frame and a rotating plate at the inner side of the frame, the receiving portion configured to receive and secure a member of a lock structure in a locked position, wherein the rotatable cam is rotatably connected at a mid outer portion of the rotating plate to a second end portion of the third linkage member.

2. The lock mechanism of claim 1, wherein when the piston is in the retracted position, the rotatable cam is in a first position, and wherein during outward extension of the shaft, the first linkage member applies a pushing force via its connection to the second linkage member causing the second linkage member to rotate so as to transfer a pulling force via its connection to the third linkage member, such that the third linkage member is pulled upwardly so as to apply a pulling force via its connection to the rotating cam.

3. The lock mechanism of claim 1, further comprising a bias member/mechanically connected at a first end to the frame and at a second end to the first end portion of the second linkage member.

4. The lock mechanism of claim 3, wherein the bias member is configured to apply a first bias force to the second linkage member when the rotatable cam is in a first lock position, and to apply a second bias force to the second linkage member when the rotatable cam is in a second lock position.

5. The lock mechanism of claim 1, wherein the bias member comprises a spring.

6. The lock mechanism of claim 1, wherein the member of the lock structure comprises a post.

7. The lock mechanism of claim 6, wherein the receiving portion comprises a groove in the face of the rotatable cam, the groove configured to receive and secure a portion of the post therein.

8. A lock mechanism comprising:

a frame defining an outer and an inner side;

an actuator mounted on the inner side of the frame, the actuator comprising a piston that travels from a retracted position to an extended position;

a first linkage member mechanically connected at a first end to the piston;

a second linkage member mechanically connected to the first linkage member and mechanically connected to a guide member so as to rotate about the guide member, wherein the guide member rests on a portion of the first linkage when the piston is in the extended position and is moved out of the portion along a surface of the first linkage when the piston is in the retracted position;

a third linkage member mechanically connected to the second linkage member; and a rotatable cam having a receiving portion that is exposed to the outer side of the frame and a rotating plate at the inner side of the frame that is mechanically connected to the third linkage member such that extension of the piston from the retracted position to the extended position transfers a force through the first, second and third linkage members to the rotatable cam to cause rotation of the rotatable cam from a first position to a second position;

wherein the receiving portion is configured to receive and secure a member of a lock structure in a locked position.

9. The lock mechanism of claim 8, wherein the member of the lock structure comprises a post.

10. The lock mechanism of claim 9, wherein the receiving portion comprises a groove in a face of the roller cam, the groove configured to receive and secure a portion of the post therein.

* * * * *